Patented Oct. 10, 1950

2,525,433

UNITED STATES PATENT OFFICE 2,525,433

INKS

Andries Voet, New York, N. Y., assignor to J. M. Huber Corporation, Locust, N. J., a corporation of New Jersey No Drawing. Application September 23, 1947, Serial No. 775,743

19 Claims. (Cl. 106—30)

This invention relates to inks and more particularly to printing inks which contain as a binding agent a material which leaves a surface of a non-tacky nature.

Many inks, even when substantially dry, leave surfaces which have considerable tack so that they adhere to other similar surfaces particularly when slightly warm or when under pressure such as that obtained at the bottom of a pile of sheets of paper. Heat set inks usually contain binding agents of a waxy or resinous nature, such as asphalts or resins, which are thermoplastic and tend to give adherent surfaces. Water set inks often contain rosin, modified rosin or soluble phenolic resins which are not only thermoplastic but which leave surfaces having considerable tack. Asphaltic substances and rosins also are common constitutents of gravure inks. In all these cases, the solvent is usually a material of controlled volatility, such as certain petroleum fractions, or a material which is sufficiently miscible with water so that the dissolved material may be precipitated from the solvent by the application of water in some suitable form.

Many of the above types of inks have been unsatisfactory also because of the chemical activity of the binding agents. This is particularly true of some of the modified rosins which are acidic in nature. Furthermore, some of the phenolic resins have an odor which is very persistent and objectionable.

It is an object of the present invention to provide inks having a novel binding material which are useful for a wide variety of purposes. A further object is to provide inks having a binding material which leaves a non-thermoplastic film of a non-tacky nature. A still further object is to provide inks based on non-drying vehicles which contain a binding material and which may be quickly set to leave non-tacky printed surfaces. Other objects are to provide new compositions of matter and to advance the art. Still other objects will appear hereinafter.

The above and other objects may be accomplished in accordance with my invention which comprises the provision of an ink characterized by an organic water-miscible solvent in which lignin is soluble to the extent of at least 5% by weight, a pigment and a lignin which is dissolved in the solvent and serves as the binding material. I have found that lignin may be brought into a solution suitable for an ink varnish and, after printing and removal of the solvent by any means such as heat or by contact with water, will leave a film of a particularly dry nature which has little tendency to adhere to other similar films under pressure. The lignin is infusible and the films formed by it are non-thermoplastic and hence will not become tacky when warmed.

Lignin is a substance which occurs along with the cellulose, the sugar substances and the resins in woody fibers. It is extracted from wood during the process of making paper pulp and remains in the black liquor after the separation of the tall oil. Common methods for the preparation of paper pulp are the alkali process and the sulfate process, both of which produce lignin which is insoluble in water but soluble in alkaline solutions. That obtained by the sulfate process is known as sulfate lignin. That obtained by the alkali process is known as alkali lignin and, when the alkali is sodium, frequently as sodium lignin. Lignin is also obtained by extraction from wood by various solvents such as ethyl alcohol. The lignin, obtained by these various methods, is insoluble in water but soluble in aqueous alkali solutions. Derivatives of lignin such as the water-soluble lignosulfonates obtained by the sulfite process or salts thereof are not included in my invention.

I have found that lignin is soluble in many organic water-miscible solvents. Preferably, the solvent is one in which the lignin is soluble to the extent of at least 40% by weight. However, if the amount of lignin to be employed is less than 40% of the weight of the solvent, the solvent may be one which has a lower solubility for lignin although in every case the solvent should be one in which the lignin is soluble to the extent of at least 5% by weight.

Suitable solvents are the glycols, ethers of the glycols, esters of the glycols, 2-methyl 2-4-pentanediol, formamide, pyridine, methyl ethyl ketone, and the like. The glycols, their ethers and esters will generally be preferred, including the poly glycols. However, poly glycols having a molecular weight of about 600 and above are not water miscible and hence will not be suitable. Representative glycols which are satisfactory, and in which lignin is soluble to the extent of at least 40% by weight at 30° C., are ethylene glycol, diethylene glycol, cellosolve, butyl cellosolve, monobutyl ether of ethylene glycol, monomethyl ether of ethylene glycol, monoethyl ether of ethylene glycol, monomethyl ether of diethylene glycol, monoethyl ether of diethylene glycol, monobutyl ether of diethylene glycol, ethylene glycol monomethyl ether acetate, diethylene glycol monoethyl ether acetate and triethylene glycol methyl ether acetate. Lignin is soluble in 2-methyl 2-4-pentanediol to the extent of about 25% by weight. Lignin is soluble in formamide, pyridine and methyl ethyl ketone to the extent of a little more than 5% by weight.

The pigment may be any pigment of the type usually employed in inks and like coloring materials. Such pigments include carbon black titanium dioxide, red pigment, milori blue and the like. My invention is particularly applicable to the production of carbon black inks.

The amount of pigment will be that ordinarily used to provide inks of the desired color and viscosity. Uusually the pigment will be employed in the proportion from about 2% to about 60% by weight base on the solvent. In the case of carbon black the amount will be from about 2% to about 31% by weight based on the solvent and preferably from about 9% to about 31%.

The amount of lignin employed will correspond to the amount of binding material ordinarily employed in inks. The lignin will usually be employed in the proportion of from 1 part to about 5 parts by weight to each part of pigment. Larger amounts of pigment may be used but without advantage.

In some cases it may be desirable to improve the continuity of the film obtained and to increase the tackiness of the films. This may be accomplished by incorporating a resin in the ink to the extent required to produce the desired results. Any of the resins usually employed in inks and like compositions may be employed for this purpose. I preferably employ gum rosin or wood rosin for such purpose. The incorporation of rosin in the ink up to about 25% of the weight of the lignin will increase the continuity of the film but will have but little effect on the tack of the film left by the ink. Increasing amounts of rosin will increase the tack of the film and I contemplate employing rosin in the proportion of from about 25% to about 300% of the weight of the lignin for this purpose. Such amounts of rosin will not render the film undesirably tacky.

Where the ink films are to be set by means of water the composition can be varied in such a manner that it will be more easily precipitated by incorporating therein a material which is sensitive to water such as gum rosin and the aliphatic hydrocarbon-insoluble portion of wood rosin. The amount of such water sensitizing material to be employed will depend upon the sensitivity desired, the water sensitivity of the particular material and the solvent.

In order to more clearly illustrate my invention, the preferred modes of carrying it into effect, and the advantageous results to be obtained thereby the following examples are given:

*Example I*

100 parts of alkali lignin were dissolved by stirring into 100 parts of diethylene glycol at about 100° C. The solution was cooled to about 30° C. and 20 parts of carbon black was incorporated by first stirring it into the solution roughly and afterward refining it by means of a three roller mill of the standard type employed in the paint of ink industry. When printed, this ink was set by the application of water (by flowing water across the surface of the printed sheet for about 2 seconds) to give a nontacky film.

*Example II*

100 parts of sulfate lignin were dissolved in 235 parts of ethylene glycol at about 100° C. 25 parts of carbon black were added and the ink was refined on a three roller mill. This ink was printed and quickly dried by means of radiant heat to give a well fixed and nontacky film.

*Example III*

100 parts of sulfate lignin were dissolved in 120 parts of ethylene glycol and 20 parts of methyl ethyl ketone. This varnish was compounded with 60 parts of titanium dioxide and 20 parts of red pigment. This ink gave a printed sheet which dried rapidly under radiant heat at about 150° C.

*Example IV*

19 parts of sulfate lignin and 15 parts of gum rosin were dissolved in 48 parts of diethylene glycol to form an ink varnish. This was pigmented with 15 parts of channel carbon and 3 parts of milori blue. This constitutes an ink which is sufficiently sensitive to water to be easily precipitated to give nontacky printed sheets.

In a similar manner, the aliphatic hydrocarbon-insoluble portion of wood rosin may be used along with the lignin to decrease the water tolerance.

It will be understood that the preceding examples are given for illustrative purposes solely and that my invention is not intended to be limited to the specific embodiments disclosed therein. It will be apparent to those skilled in the art that many variations and modifications can be made, particularly in the pigments and solvents employed and in the modes of application of the inks. For example, the inks may be water set by employing a fine spray to wet the surface of the printed sheet or the sheet may be contacted with steam in a steam chamber or by other methods known to the art. Mixtures of two or more of the solvents may be employed. Likewise, other methods, than the three roll mill, may be employed for incorporating the pigment in the solvent, including mixture of the pigment with part or all of the lignin before incorporation in the solvent. Also, other well-known water sensitizing agents may be employed in place of those specifically disclosed. In addition, various other materials, ordinarily employed for modifying the viscosity, stability, flow characteristics and like properties of inks, may be incorporated.

It will be apparent that, by my invention, I have provided new and valuable inks having many novel and desirable properties and particularly inks which will leave films varying from non-thermoplastic nontacky films to substantially tacky films, the tackiness of which can be readily controlled. At the same time, I have employed a cheap and abundant material, lignin, which has been discarded as waste material in large quantities. The inks of my invention are particularly suitable for use on surfaces which have a slight porosity such as paper, leather, wood, cloth and the like. By the use of my invention, it is possible to provide a large variety of inks having a wide utility.

I claim:

1. An ink consisting essentially of a water-miscible neutral aliphatic solvent containing from 2 to 8 carbon atoms and only carbon, hydrogen and oxygen and in which lignin is soluble to the extent of at least 5% by weight, a pigment in the proportion of from about 2% to about 60% by weight based on the solvent, and lignin in the proportion of from 1 part to about 5 parts by weight to each part of pigment.

2. An ink consisting essentially of a water-miscible neutral aliphatic solvent containing from 2 to 8 carbon atoms and only carbon, hydrogen and oxygen and in which lignin is soluble to the extent of at least 40% by weight, a pigment in the proportion of from about 2% to about 60% by weight based on the solvent, and lignin in the proportion of from 1 part to about 5 parts by weight to each part of pigment.

3. An ink consisting essentially of a water-miscible neutral aliphatic solvent containing from 2 to 8 carbon atoms and only carbon, hydrogen and oxygen and in which lignin is soluble to the extent of at least 5% by weight, carbon black in the proportion of from about 2% to about 31% by weight based on the solvent, and lignin in the proportion of from 1 part to about 5 parts by weight to each part of carbon black.

4. An ink consisting essentially of a water-miscible neutral aliphatic solvent containing from 2 to 8 carbon atoms and only carbon, hydrogen and oxygen and in which lignin is soluble to the extent of at least 10% by weight, carbon black in the proportion of from about 9% to about 31% by weight based on the solvent, and lignin in the proportion of from 1 part to about 5 parts by weight to each part of carbon black.

5. An ink consisting essentially of a water-miscible neutral aliphatic solvent containing from 2 to 8 carbon atoms and only carbon, hydrogen and oxygen which is a member of the class consisting of glycols, ethers of glycols and esters of glycols and in which lignin is soluble to the extent of at least 40% by weight, carbon black in the proportion of from about 2% to about 31% by weight based on the solvent, and lignin in the proportion of from 1 part to about 5 parts by weight to each part of carbon black.

6. An ink consisting essentially of a water-miscible neutral aliphatic solvent containing from 2 to 8 carbon atoms and only carbon, hydrogen and oxygen which is a member of the class consisting of glycols, ethers of glycols and esters of glycols and in which lignin is soluble to the extent of at least 40% by weight, carbon black in the proportion of from about 9% to about 31% by weight based on the solvent, and lignin in the proportion of from 1 part to about 5 parts by weight to each part of carbon black.

7. An ink consisting essentially of a water-miscible neutral aliphatic solvent containing from 2 to 8 carbon atoms and only carbon, hydrogen and oxygen which is a member of the class consisting of glycols, ethers of glycols and esters of glycols and in which lignin is soluble to the extent of at least 5% by weight, a pigment in the proportion of from about 2% to about 60% by weight based on the glycol, and lignin in the proportion of from 1 part to about 5 parts by weight to each part of pigment.

8. An ink consisting essentially of a water-miscible glycol in which lignin is soluble to the extent of at least 40% by weight, a pigment in the proportion of from about 2% to about 60% by weight based on the glycol, and lignin in the proportion of from 1 part to about 5 parts by weight to each part of pigment.

9. An ink consisting essentially of a water-miscible neutral aliphatic solvent containing from 2 to 8 carbon atoms and only carbon, hydrogen and oxygen which is a member of the class consisting of glycols, ethers and glycols and esters of glycols and in which lignin is soluble to the extent of at least 5% by weight, carbon black in the proportion of from about 2% to about 31% by weight based on the glycol, and lignin in the proportion of from 1 part to about 5 parts by weight to each part of carbon black.

10. An ink consisting essentially of a water-miscible glycol in which lignin is soluble to the extent of at least 10% by weight, carbon black in the proportion of from about 9% to about 31% by weight based on the glycol, and lignin in the proportion of from 1 part to about 5 parts by weight to each part of carbon black.

11. An ink consisting essentially of a water-miscible neutral aliphatic solvent containing from 2 to 8 carbon atoms and only carbon, hydrogen and oxygen which is a member of the class consisting of glycols, ethers of glycols and esters of glycols and in which lignin is soluble to the extent of at least 40% by weight, carbon black in the proportion of from about 2% to about 31% by weight based on the glycol, and lignin in the proportion of from 1 part to about 5 parts by weight to each part of carbon black.

12. An ink consisting essentially of a water-miscible glycol in which lignin is soluble to the extent of at least 40% by weight, carbon black in the proportion of from about 9% to about 31% by weight based on the glycol, and lignin in the proportion of from 1 part to about 5 parts by weight to each part of carbon black.

13. An ink consisting essentially of a water-miscible neutral aliphatic solvent containing from 2 to 8 carbon atoms and only carbon, hydrogen and oxygen and in which lignin is soluble to the extent of at least 5% by weight, a pigment in the proportion of from about 2% to about 60% by weight based on the solvent, and lignin in the proportion of from 1 part to about 5 parts by weight to each part of pigment, and rosin in the proportion of from about 25% to about 300% by weight based on the lignin.

14. An ink consisting essentially of an organic water-miscible neutral aliphatic solvent containing from 2 to 8 carbon atoms and only carbon, hydrogen and oxygen and in which lignin is soluble to the extent of at least 40% by weight, a pigment in the proportion of from about 2% to about 60% by weight based on the solvent, and lignin in the proportion of from 1 part to about 5 parts by weight to each part of pigment, and rosin in the proportion of from about 25% to about 300% by weight based on the lignin.

15. An ink consisting essentially of a water-miscible neutral aliphatic solvent containing from 2 to 8 carbon atoms and only carbon, hydrogen and oxygen which is a member of the class consisting of glycols, ethers of glycols and esters of glycols and in which lignin is soluble to the extent of at least 40% by weight, carbon black in the proportion of from about 9% to about 31% by weight based on the glycol, and lignin in proportion of from 1 part to about 5 parts by weight to each part of carbon black, and rosin in the proportion of from about 25% to about 300% by weight based on the lignin.

16. An ink consisting essentially of diethylene glycol, a pigment in the proportion of from about 2% to about 60% by weight based on the diethylene glycol, and lignin in the proportion of from 1 part to about 5 parts by weight to each part of pigment.

17. An ink consisting essentially of diethylene glycol, carbon black in the proportion of from about 2% to about 31% by weight based on the diethylene glycol, and lignin in the proportion of from 1 part to about 5 parts by weight to each part of carbon black.

18. An ink consisting essentially of ethylene glycol, a pigment in the proportion of from about 2% to about 60% by weight based on the ethylene glycol, and lignin in the proportion of from 1 part to about 5 parts by weight to each part of pigment.

19. An ink consisting essentially of ethylene glycol, carbon black in the proportion of from about 2% to about 31% by weight based on the ethylene glycol, and lignin in the proportion of from 1 part to about 5 parts by weight to each part of carbon black.

ANDRIES VOET.

REFERENCES CITED

The following references are of record in the file of this patent:

UNITED STATES PATENTS

| Number | Name | Date |
| --- | --- | --- |
| 1,860,043 | Ludwigsen | May 24, 1932 |
| 2,242,601 | Wallace | May 20, 1941 |
| 2,327,596 | Erickson et al. | Aug. 24, 1943 |
| 2,377,709 | Meunier | June 5, 1945 |

FOREIGN PATENTS

| Number | Country | Date |
| --- | --- | --- |
| 248,834 | Great Britain | Mar. 10, 1926 |

OTHER REFERENCES

Mitchel et al.: "Inks, Their Composition and Manufacture," (1916), pages 147 to 150.